(12) United States Patent
Moribe et al.

(10) Patent No.: US 7,102,986 B2
(45) Date of Patent: Sep. 5, 2006

(54) OPTICAL DISK

(75) Inventors: Mineo Moribe, Kawasaki (JP); Sumio Kuroda, Kawasaki (JP); Koichi Iida, Kawasaki (JP); Hiroyuki Takemoto, Tokyo (JP)

(73) Assignees: Fujitsu Limited, Kawasaki (JP); Sony Corporation, Tokyo (JP)

( * ) Notice: Subject to any disclaimer, the term of this patent is extended or adjusted under 35 U.S.C. 154(b) by 884 days.

(21) Appl. No.: 10/199,153

(22) Filed: Jul. 19, 2002

(65) Prior Publication Data

US 2004/0013080 A1    Jan. 22, 2004

(51) Int. Cl.
*G11B 7/24* (2006.01)

(52) U.S. Cl. ............................... 369/275.3; 369/275.4

(58) Field of Classification Search ............ 369/275.3, 369/275.4, 275.2, 275.1, 59.25, 46.29, 44.36, 369/47.19, 59.75, 44.26, 44.28
See application file for complete search history.

(56) References Cited

U.S. PATENT DOCUMENTS

| | | | | |
|---|---|---|---|---|
| 5,204,852 A | * | 4/1993 | Nakagawa et al. | 369/275.1 |
| 5,583,847 A | * | 12/1996 | Takeshima et al. | 369/275.4 |
| 5,796,712 A | * | 8/1998 | Moribe et al. | 369/275.4 |
| 5,943,313 A | * | 8/1999 | Ando et al. | 369/275.4 |
| 6,163,521 A | * | 12/2000 | Konishi et al. | 369/275.3 |
| 6,418,111 B1 | * | 7/2002 | Takemura et al. | 369/275.3 |
| 6,781,949 B1 | * | 8/2004 | Morimoto | 369/275.3 |

FOREIGN PATENT DOCUMENTS

| | | |
|---|---|---|
| JP | 6-028729 | 2/1994 |
| JP | 7-110944 | 4/1995 |
| JP | 8-063794 | 3/1996 |
| JP | 9-054958 | 2/1997 |
| JP | 9-081965 | 3/1997 |
| JP | 9-231576 | 9/1997 |
| JP | 9-274733 | 10/1997 |
| JP | 10-079125 | 3/1998 |

\* cited by examiner

*Primary Examiner*—Ali Neyzari
(74) *Attorney, Agent, or Firm*—Greer, Burns & Crain, Ltd.

(57) ABSTRACT

The present invention provides an optical disk comprising: at least a rewritable region and a read-only data region, wherein the rewritable region includes a plurality of groove tracks and a plurality of land tracks, the read-only data region includes a plurality of groove tracks and a plurality of land tracks, read-only data comprising control data are written as concavo-convex pits to the groove tracks and/or the land tracks in the read-only data region, and the width of each groove in the read-only data region is smaller than that of each groove in the rewritable region. According to the first optical disk of the present invention, the area of rewritable regions for users can be ensured as broadly as possible failing to deteriorate the high-speed performance of the system.

7 Claims, 6 Drawing Sheets

OPTICAL DISK

CROSS-REFERENCE TO RELATED APPLICATION

This application is related to international application No. PCT/JP00/01156 filed on Feb. 28, 2000, whose priority is claimed under 35 USC §120, the disclosure of which is incorporated by reference in its entirety.

TECHNICAL FIELD

The present invention relates to optical disks. In particular, the present invention relates to an optical disk provided with a read-only data region.

BACKGROUND ART

Rewritable and removable optical disks have been widely used as file memories for personal computers. Hitherto, various technologies for increasing the recording density of the optical disks have been developed.

Methods for recording marks (mark position recording/mark length recording), methods for dividing regions into sectors (Constant Angular Velocity/Zone Constant Angular Velocity: CAV/ZCAV), and the like are known as methods for increasing the recording density. Other than these methods, a method for reducing the track pitch or the mark length by using light having a shorter wavelength is known. This method has significantly contributed to the increase of recording density.

Hitherto, a so-called land recording method has been used, in which data are only written to and read from tracks, each track being formed with a land disposed between guide grooves (pregrooves). Recently, however, a so-called land/groove recording method has been also put into practical use for optical disks, in which the data are written in the grooves in addition to the lands, with the width of each groove (width in the direction of the shorter axis of the groove) being increased. In the present description, regions of an optical disk where data can be written to and read from are referred to as rewritable regions.

Figure 8:
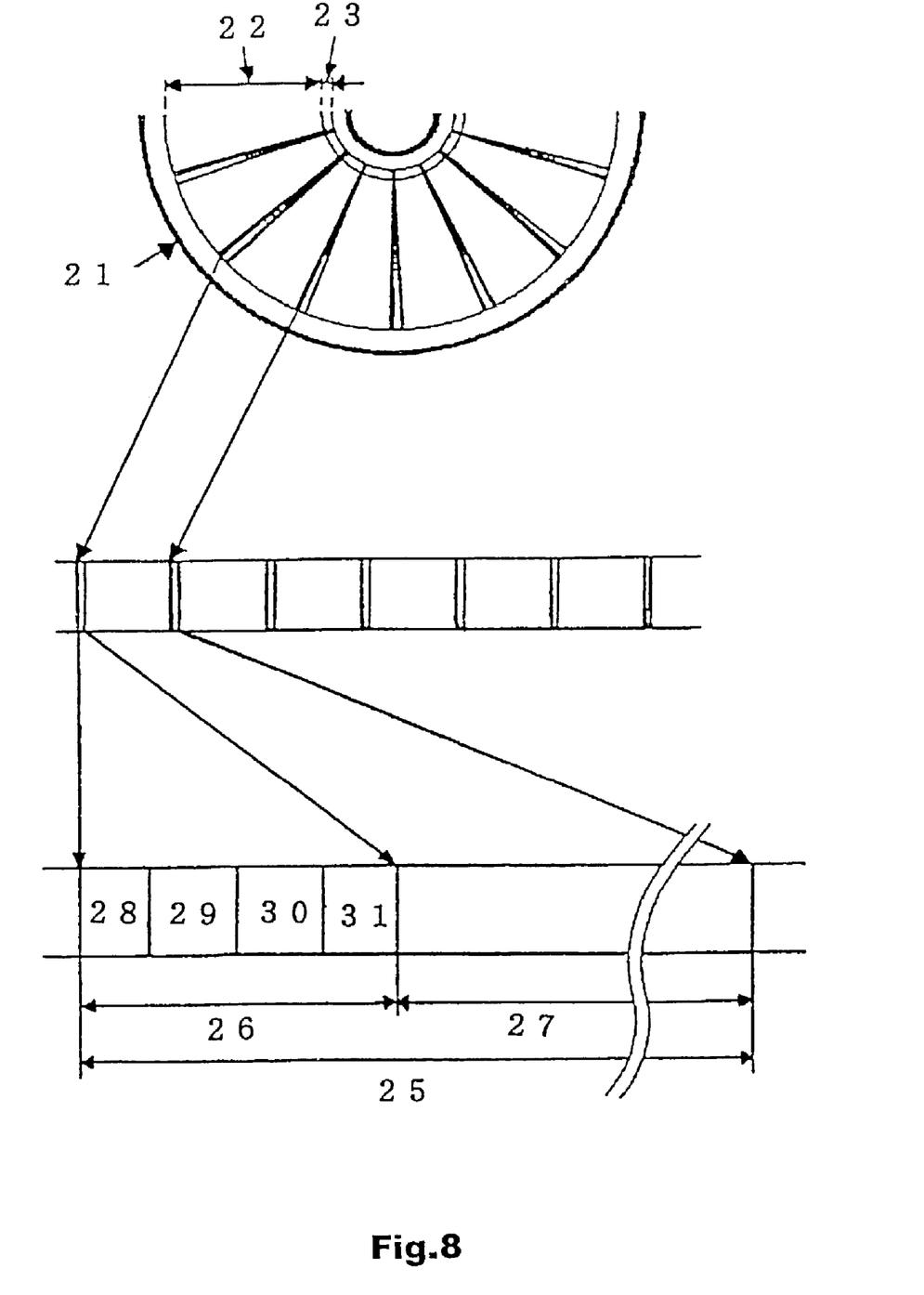
FIG. 8 is a schematic view showing the layout of a control data region and a header data region on an optical disk.

An optical disk must be recorded in advance with read-only data which are so-called control data, such as the type of the optical disk and recording conditions, and which are not erasable. An example of the layout of the control data on an optical disk is shown in FIG. 8. In FIG. 8, numeral 21 denotes an optical disk, numeral 22 denotes a rewritable region, and numeral 23 denotes a region in which the control data are recorded (hereinafter referred to as a control data region).

In the land recording method, the control data are recorded on the optical disk with concavo-convex pit rows being formed along land tracks. In a land/groove recording method, the control data are recorded with the concavo-convex pit rows being formed in a flat region instead of the rewritable region. In this case, the capacity of the optical disk is inefficiently used by providing the flat region.

Another method for recording the control data is disclosed in, for example, Japanese Unexamined Patent Publication No. HEI 9(1997)-274733, in which recording is performed by forming pit rows in a flat region, the pit rows having the same track pitch as grooves.

However, since the concavo-convex pits are formed in a flat surface which has no grooves, an optical head is likely to mistakenly detect the track pitch when the optical head seeks the flat surface, and there is a risk in that desired control can not be performed.

In addition to the control data, the optical disk has read-only data recorded, which are header data, such as a sector mark, a synchronizing signal (VFO), an address mark, and ID (IDentification) data, at the header of each sector as a unit which forms the rewritable region, the recording being performed by forming the concavo-convex pit rows, so that high-speed access is possible. In particular, the header data are recorded in the form shown in FIG. 8. In FIG. 8, numeral 25 denotes a sector, numeral 26 denotes a region in which the header data are recorded (hereinafter referred to as a header data region), and numeral 27 denotes a rewritable region. The header data region 26 includes a sector-mark region 28, a VFO region 29, an address-mark region 30, an ID-data region 31, and the like in the order in the track direction.

In a magneto-optical disk, which is one type of optical disk, a technology for high-resolution reading from magneto-optical marks each having a size smaller than the diffraction limit of the reading light (magnetic super resolution technology) is used. However, since the resolution for reading the above-described concavo-convex pits is not increased by this technology, data which are written by using the concavo-convex pits having the same pitch as the magneto-optical marks along the circumference of the disk (in the track direction) could not be read at high resolution. Therefore, in order to read data from the magneto-optical marks and data (the control data and header data) from the concavo-convex pits, it is necessary to make the recording frequency of the latter lower than that of the former.

It is also difficult to read in the radial direction (the seek direction) of a magneto-optical disk from the concavo-convex pits formed at the same track pitch as that of the magneto-optical marks, at high resolution while reducing crosstalk. Therefore, methods in which the concavo-convex pits for header data in land tracks and in groove tracks are offset from each other along the circumference have been proposed (for example, in Japanese Unexamined Patent Publication Nos. HEI 6(1994)-28729 and HEI 10(1998)-79125).

Also, a method has been proposed (for example, in Japanese Unexamined Patent Publication No. HEI 7(1995)-110944), in which, since a sector mark, for example, of the header data is commonly used in each track, the sector-mark regions, each indicating the start of a header data region, are disposed every two tracks, and when the optical head is positioned at a track where no sector mark is provided, the optical head detects crosstalk data from the sector-mark regions of the adjacent tracks as the sector mark of the track at which the optical head is positioned (for example, in Japanese Unexamined Patent Publication No. HEI 7(1995)-110944). However, in this method, there is a problem in that the length of the sector mark which is read from the crosstalk is recognized to be smaller than that of the sector mark which is read by the optical head when it is positioned at the track on which the sector mark is provided.

Another method has been proposed (for example, in Japanese Unexamined Patent Publication No. HEI 9(1997)-81965), in which the concavo-convex pits for sector marks are disposed in the land tracks and in the groove tracks. However, a problem has been found in this method in that the seeking performance of the optical head is reduced because large distortion of a track error signal is produced.

SUMMARY OF THE INVENTION

The present invention provides an optical disk comprising: at least a rewritable region and a read-only data region, wherein the rewritable region includes a plurality of groove tracks and a plurality of land tracks, the read-only data region includes a plurality of groove tracks and a plurality of land tracks, read-only data comprising control data are written as concavo-convex pits to the groove tracks and/or the land tracks in the read-only data region, and the width of each groove in the read-only data region is smaller than that of each groove in the rewritable region.

Further, the present invention provides an optical disk for a land/groove recording method comprising: a plurality of groove tracks each including a rewritable region and a plurality of land tracks each including a rewritable region, wherein each of the tracks is divided into a plurality of sectors, the optical disk is provided with read-only data regions which are individually positioned in the sectors of the groove tracks and the land tracks and which are written with read-only data, which are header data, as concavo-convex pits, the read-only data written to the groove tracks include data common to the read-only data written to the land tracks, some or all of concavo-convex pits of the groove tracks representing the common data have a different width and depth from the width and depth of some or all of concavo-convex pits of the land tracks representing the common data, and said some or all of the concavo-convex pits of the groove tracks are adjacent to said some or all of the concavo-convex pits of the land tracks in the radial direction of the optical disk.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 5(*a*) and 5(*b*) are schematic perspective views of an optical disk according to a third embodiment of the present invention.

FIGS. 7(*a*) and 7(*b*) are illustrations of signals obtained from the optical disk shown in FIG. 6.

EMBODIMENT FOR CARRYING OUT THE INVENTION

A first object of the present invention is to provide an optical disk in which the area of rewritable regions for users can be ensured as broadly as possible and read-only data regions (control data regions and header data regions) provided with concavo-convex pits as read-only data are provided, failing to deteriorate the high-speed performance (for example, seeking performance of an optical head) of the system when writing to and reading from the optical disk.

A second object of the present invention is to provide an optical disk in which read-only data regions (header data regions) provided with concavo-convex pits, which are difficult to read at high resolution by a magnetic super-resolution reading method, are efficiently positioned. In particular, the object is to provide the optical disks in which the start of each sector in a plurality of land tracks and a plurality of groove tracks can be detected accurately.

The optical disk according to the present invention can be used as a phase-change optical disk, a magneto-optical disk or the like. The optical disk includes a disk substrate provided with a recording layer (for example, a phase-change layer in the phase-change optical disk, and a magnetic layer in the magneto-optical disk). Any known materials may be used for the disk substrate and the recording layer. The optical disk may be provided with other components, such as a protection layer, if necessary. The lands, grooves, and concavo-convex pits may be formed by any known method, such as a forming method using a stamper.

The width and depth of the grooves and the width and height of the lands formed in the rewritable regions and the read-only data regions may be set appropriately.

Control data regions of the read-only data region are described below.

In order to read control data without deteriorating the seeking performance of the optical head, concavo-convex pits representing the data may be formed either in a continuous groove track, in land tracks disposed between groove tracks, or in the groove tracks and the land tracks. The concavo-convex pits adjacent to each other in the track direction are disposed at a predetermined distance from each other. Generally, the groove tracks and the land tracks are each formed concentrically or in spiral. The control data regions may be disposed toward the inside and/or the outside of the optical disk in the seek direction.

The concavo-convex pits are preferably formed in the groove tracks because an excellent signal oscillation can be thereby obtained compared with a case in which the concavo-convex pits are formed in the land tracks. When the concavo-convex pits are alternately formed in the groove tracks and in the land tracks, the control data can be reliably obtained when the optical head tracks either the groove tracks or the land tracks. When the concavo-convex pits are formed in the land tracks, the seeking performance can be prevented from deterioration by optimizing the shapes of the concavo-convex pits and the grooves.

Figure 5A:
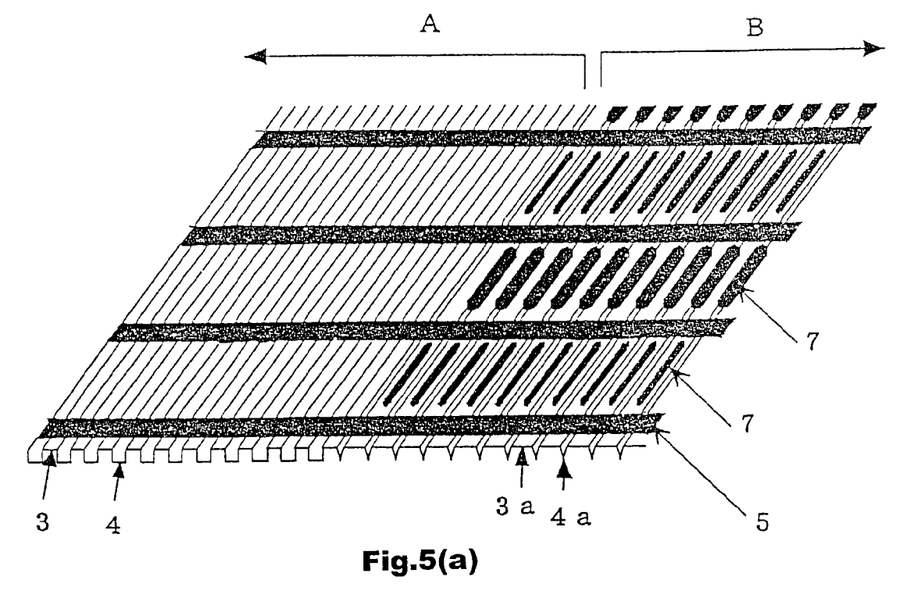
Figure 5B:
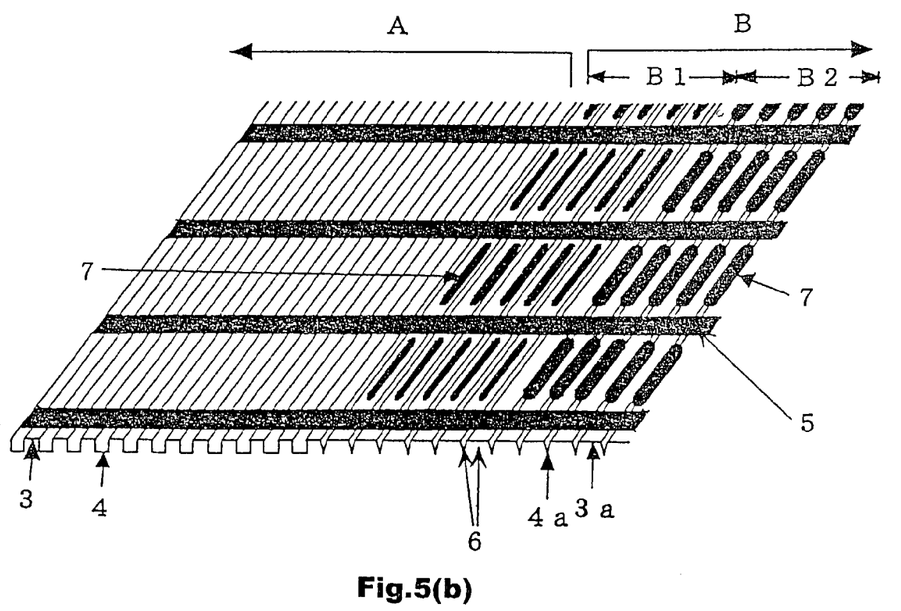

When the concavo-convex pits are formed in the groove tracks and the land tracks, the concavo-convex pits may be alternately disposed in the land tracks and the groove tracks in the track direction, as shown in FIG. 5(*a*). Alternatively, as shown in FIG. 5(*b*), a group of a plurality of the concavo-convex pits which are only formed in the land tracks and another group of a plurality of the concavo-convex pits which are only formed in the groove tracks may be disposed adjacent to each other. In FIGS. 5(*a*) and 5(*b*), numeral 7 denotes the plurality of concavo-convex pits representing the control data which are shown as an ellipse in order to simplify the drawing. A detailed description with regard to FIGS. 5(*a*) and 5(*b*) is provided below.

The control data to be obtained from the concavo-convex pits formed in the groove tracks and the land tracks may be data differing from each other or may be the same data. For example, the control data obtained from the concavo-convex pits formed in the groove tracks may be data regarding the groove tracks in the rewritable regions, and the control data obtained from the concavo-convex pits formed in the land tracks may be data regarding the land tracks in the rewritable regions.

The present invention is characterized in that the width of each groove formed in the control data regions is smaller than the width of the groove formed in the rewritable regions or smaller than the aperture width of each concavo-convex pit. This arrangement suppresses counting errors of the number of tracks and contributes to the generation of control data signals at a predetermined level of strength.

The header data regions of the read-only data region are described below.

Generally, the tracks in the rewritable region are each divided into a plurality of sectors. The concavo-convex pits representing header data are formed in each sector. The header data regions are generally positioned at the start of the sectors.

Each header data region includes, for example, a sector-mark region 28 indicating the start of a sector 25, a VFO region 29 for generating clocks for reading address data, an address-mark region 30 for indicating the start of the address data, an ID data (address data) region 31, and the like, as shown in FIG. 8.

The concavo-convex pits representing VFO, address marks, and ID data are preferably offset in the track direction by a predetermined distance from each other between the adjacent land tracks and groove tracks. Some or all of the concavo-convex pits may be adjacent to each other, when the concavo-convex pits represent the header data common between each sector (for example, sector marks and VFO) and are formed in the adjacent land and groove tracks. In this case, the concavo-convex pits formed in the adjacent land tracks and the groove tracks preferably have depths and/or widths differing from each other. The aperture of each concavo-convex pit formed in the land track, in particular, preferably has a width and/or a depth smaller than the aperture width (the aperture width along the shorter axis of the groove) and/or the depth of the concavo-convex pits formed in the groove tracks, whereby distortion of tracking error signals can be reduced.

Setting of the aperture width and depth of the concavo-convex pits and the width and depth of the grooves formed in the read-only data regions is described below.

Parameters comprising the above widths and depths are related to each other and vary the amplitude and the phase of pit signals and tracking signals.

Regarding the groove tracks, since the concavo-convex pits are formed in the groove tracks, tracking signals are obtained from the groove tracks and the concavo-convex pits, which are in positive phase each other, whereby it is not necessary to consider the phase of the tracking signals. Therefore, the depth and/or the aperture width of the concavo-convex pits of the groove tracks can be increased. The depth and/or the aperture width of the concavo-convex pits may be larger than the depth and/or the width of the grooves.

Regarding the land tracks, opposite-phase tracking signals are generated from the concavo-convex pits formed in the land tracks. Therefore, the tracking signals from the groove tracks are preferably made stronger than the tracking signals from the concavo-convex pits by forming the depth of the concavo-convex pits smaller and the depth and/or the width of the grooves larger. The depth and/or the aperture width of the concavo-convex pits preferably have sizes such that the signals can be obtained from the concavo-convex pits and the tracking signals therefrom do not become irregular.

The widths and depths of the grooves and the concavo-convex pits can be determined by forming optical disks in which the widths and depths of the grooves and the concavo-convex pits are varied, and by selecting an optical disk among these optical disks which provides the best conditions. For example, when the amplitude of the signals of the read-only data obtained from the concavo-convex pits formed in the groove tracks is small, the depth and/or the aperture width of the concavo-convex pits are increased or the depth and/or the width of the grooves are reduced. When the amplitude of the signals of the read-only data obtained from the concavo-convex pits formed in the land tracks is small, the same modification as for the groove tracks is performed for the land tracks. In this case, the amplitude of the tracking signals is preferably set equal to or more than that which is necessary. On the other hand, when the amplitude of the tracking signals is small, the depth and/or the width of the grooves are increased or the depth and/or the aperture width of the concavo-convex pits are reduced. In this case, the amplitude of the signals of the read-only data is preferably set equal to or more than that which is necessary.

The present invention is further described below according to embodiments and comparative examples. However, the present invention is not limited to these embodiments and comparative examples.

First Embodiment

Figure 1:
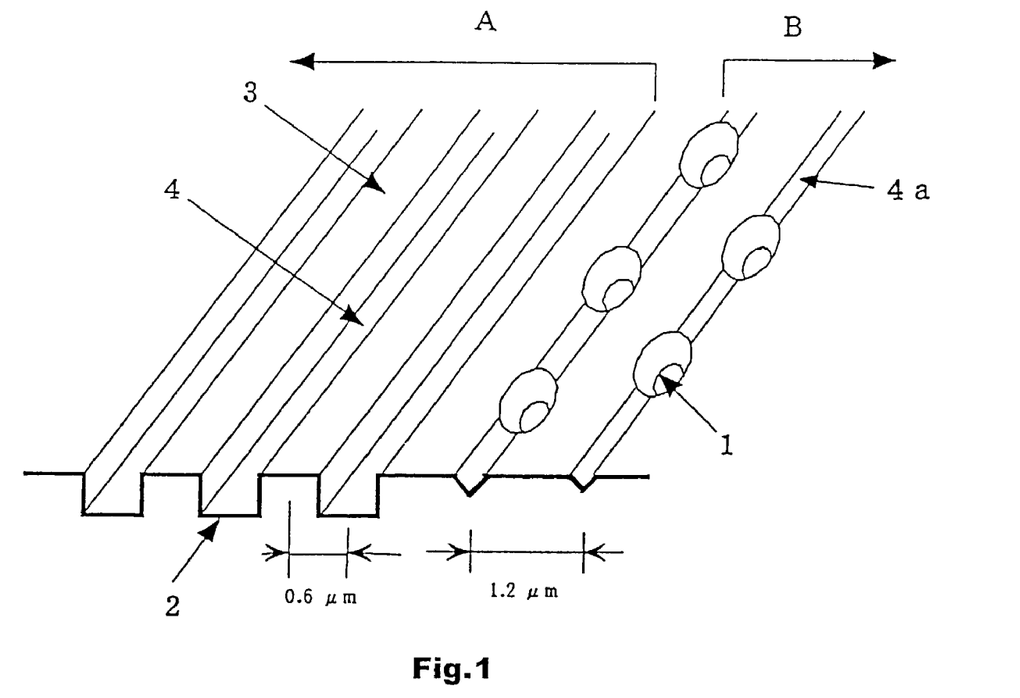
FIG. 1 is a schematic perspective view of an optical disk according to a first embodiment of the present invention.

FIG. 1 is a schematic perspective view of an optical disk according to a first embodiment of the present invention. The optical disk shown in FIG. 1 is provided with a land track/groove track region A which is a rewritable region and a control data region B as a read-only data region adjacent to the region A, the control data region B being provided with concavo-convex pits 1 representing control data. The optical disk shown in FIG. 1 is provided with a magnetic super-resolution magneto-optical recording film 2, for example, which includes three layers of GdFeCo/GdFeCoSi/TbFeCo deposited on a polycarbonate substrate.

The track pitch of the land track/groove track region A is 0.6 µm. The widths of a land 3 and a groove 4 are substantially the same as each other, which is 0.6 µm. The depth of the groove 4 is 55 nm.

Indented pits 1 formed in the control data region B each have an aperture width of 0.4 µm and a depth of 55 nm. Grooves 4a formed in the region B each have an aperture width of 0.2 µm and a depth of 17 nm, and a V-shaped section in a direction perpendicular to the longitudinal direction. The pitch of the grooves 4a formed in the region B is 1.2 µm which is the same as the pitch of the grooves 4 formed in the region A.

Figure 2:
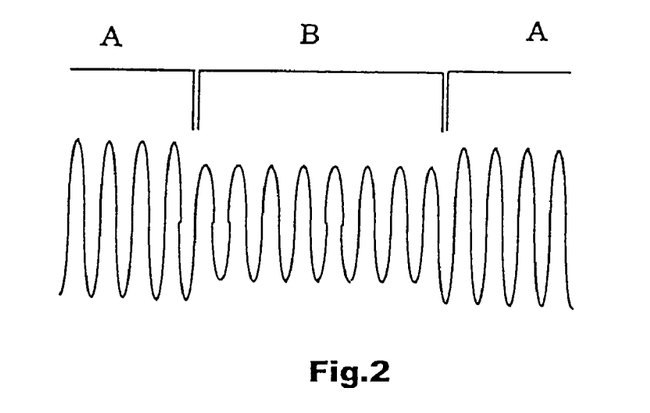
FIG. 2 is an illustration showing a tracking error signal obtained during seeking the optical disk shown in FIG. 1.

FIG. 2 shows a tracking error signal (TES) when an optical head seeks the optical disk shown in FIG. 1. This signal has a wider band for counting the number of tracks. Although in FIG. 2, the amplitude is reduced a little in the control track region B, there is no effect on counting of the number of tracks, whereby excellent seeking is possible.

Figure 3:
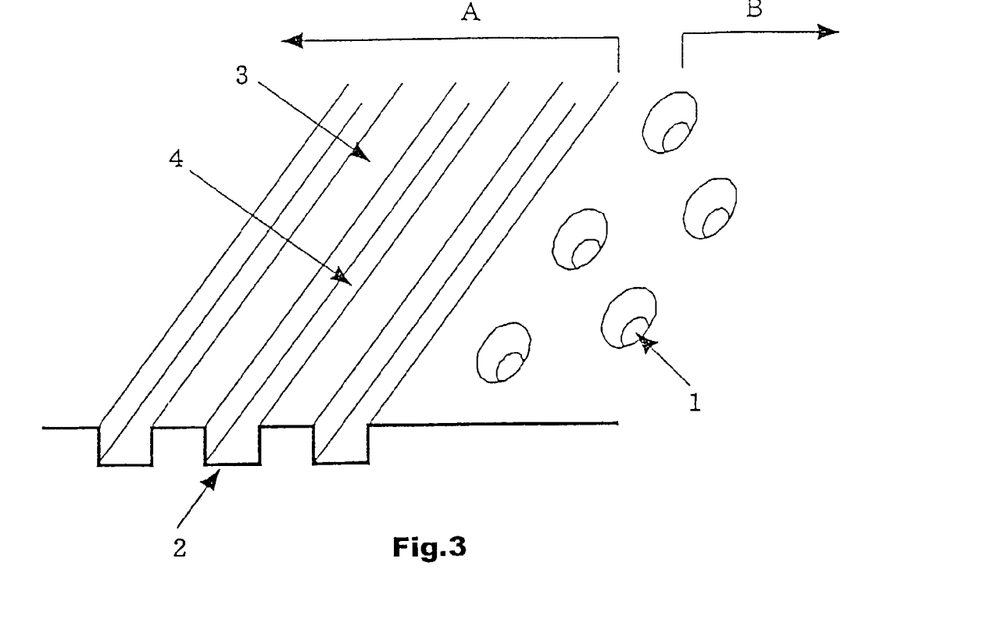
FIG. 3 is a schematic perspective view of a comparative example of an optical disk.

FIG. 3 shows a comparative example of the optical disk. The optical disk shown in FIG. 3 has the same configuration as the optical disk shown in FIG. 1 except that no groove is formed in the control track region B. The TES from this optical disk was measured in the same manner as from the optical disk shown in FIG. 1. As a result, a part of the TES was not measured due to the lack of grooves, and the risk of an incorrect operation due to errors in counting the number of tracks was found.

Second embodiment

Figure 4:
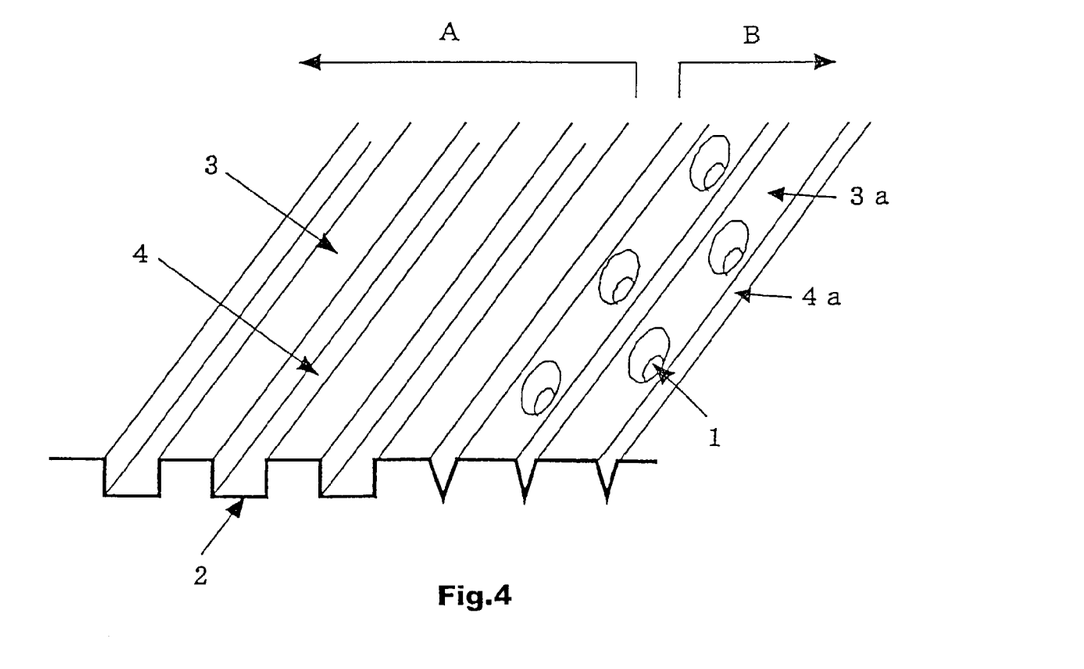
FIG. 4 is a schematic perspective view of an optical disk according to a second embodiment of the present invention.

FIG. 4 shows an optical disk according to a second embodiment of the present invention. This optical disk is provided with concavo-convex pits 1 in lands 3a disposed in a control data region B. Grooves 4a formed in the control data region B each have an aperture width of 0.4 µm and a depth of 55 nm. The concavo-convex pits 1 each have a width of 0.4 µm and a depth of 50 nm. Other configuration is the same as that of the optical disk shown in FIG. 1. In the optical disk shown in FIG. 4, excellent seeking is possible, as in the optical disk shown in FIG. 1.

Third Embodiment

FIGS. 5(a) and 5(b) show an optical disk according to a third embodiment of the present invention. The optical disk shown in these drawings has the same configuration as that of the optical disk shown in FIG. 1 except that concavo-convex pits are provided both in lands 3a and grooves 4a which are formed in a control data region B. In FIGS. 5(a) and 5(b), numeral 5 denotes header data regions, numeral 6 denotes buffer tracks, and numeral 7 denotes control data. The header data regions 5 and the control data regions 7 include concavo-convex pit rows each including a plurality of concavo-convex pits, which are shown in a simplified form in the drawings.

In FIG. 5(a), in the seek direction, pit rows 7 each including a plurality of the concavo-convex pits formed in the lands 3a and the pit rows 7 each including a plurality of the concavo-convex pits formed in the grooves 4a are alternately disposed in the track direction with the header data regions 5 therebetween. That is, in sectors arrayed in certain radial directions of the optical disk, the control data are disposed on the lands, and in sectors arrayed in other radial directions of the optical disk, the control data are disposed in the grooves. In FIG. 5(b), a group of the pit rows 7 each including a plurality of the concavo-convex pits formed on the lands 3a and another group of the pit rows 7 each including a plurality of the concavo-convex pits formed in the grooves 4a are separately disposed in the seek direction. That is, in a region B 1, the control data are only formed on the lands, and in a region B2, the control data are only formed in the grooves.

In FIG. 5(b), a buffer track 6 is provided between one of the pit rows 7 disposed on the lands 3a and one of the pit rows 7 disposed in the grooves 4a adjacent to each other, for avoiding incorrect operations.

Excellent seeking is possible in the optical disk shown in FIGS. 5(a) and 5(b), as in the optical disk shown in FIG. 1.

Fourth Embodiment

Figure 6:
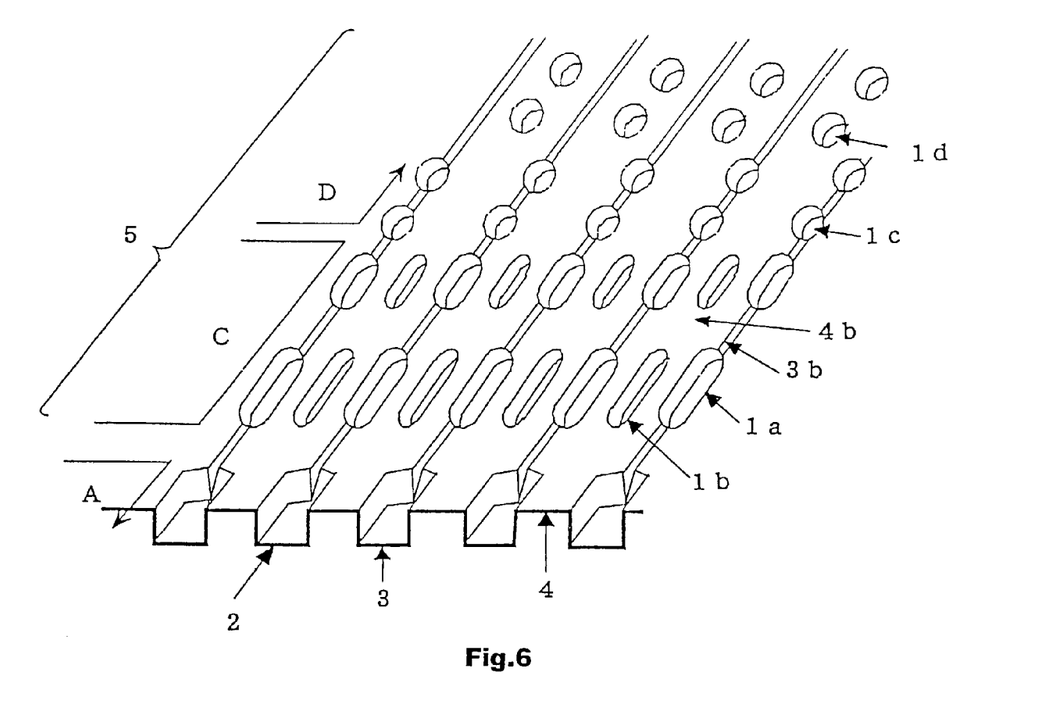
FIG. 6 is a schematic perspective view of an optical disk according to a fourth embodiment of the present invention.

FIG. 6 shows an optical disk according to a fourth embodiment of the present invention. FIG. 6 shows the vicinity of sector marks which indicate the start of sectors.

A header data region 5 as a read-only data region is formed on the extension of a land/groove region A as a rewritable region. The header data region 5 includes a sector mark region C and another region D. The sector mark region C is actually provided with numbers of concavo-convex pits; however, the sector mark region C shown in FIG. 6 is provided simply with sets of two elliptic pits. Sector marks of the sectors have data common to each other (the same data). The region D is actually provided with concavo-convex pits representing VFO, address marks, ID data, and the like; however, the region D shown in FIG. 6 is provided simply with sets of two circular pits. Indented pits 1c are formed in grooves and concavo-convex pits 1d are formed in lands.

The header data region 5 is provided with narrow grooves 3b (having a width of 0.2 µm and a depth of 17 nm) having a V-shaped section and extending from grooves 3 (having a width of 0.6 µm and a depth of 55 nm) formed in the land/groove region A so as to pass through concavo-convex pits 1a, the grooves 3b serving to count the number of tracks during seeking.

When the aperture width of concavo-convex pits 1b formed in lands 4b disposed in the sector mark region C is excessively large in FIG. 6, the distortion of TES is increased. Therefore, the aperture width and/or the depth of the concavo-convex pits 1b formed in the lands 4b are preferably smaller than the aperture width and/or the depth of the concavo-convex pits 1a formed in the grooves 3b. The width and/or the depth may be determined to be optimum values by varying the sizes of the concavo-convex pits 1a and 1b formed along tracks of the grooves 3b and the lands 4b, respectively, while observing the amplitude of signal of the read sector marks and the distortion of the TES from the tracks. In FIG. 6, the aperture width of the concavo-convex pits 1b formed in the lands 4b is set to 0.2 µm, and the depth thereof is set to 50 nm. The aperture width of the concavo-convex pits 1a formed in the grooves 3b is set to 0.4 µm, and the depth thereof is set to 55 nm.

In FIG. 6, the concavo-convex pits 1d formed in the lands 4b disposed in the land track region D are offset in the track direction from the concavo-convex pits 1c formed in the grooves 3b disposed in the groove track region D.

Figure 7A:
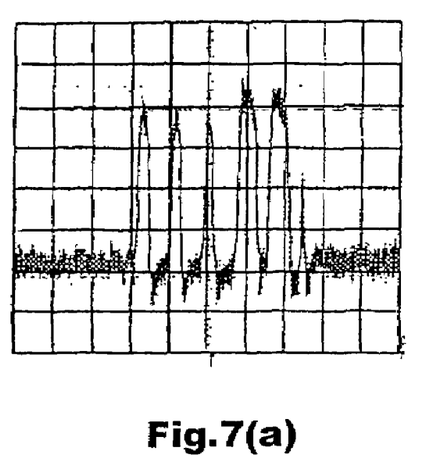
Figure 7B:
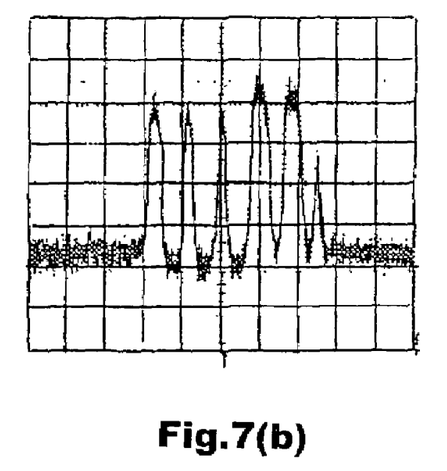

FIGS. 7(a) and 7(b) show signals obtained from the sector mark region of the optical disk shown in FIG. 6. FIG. 7(a) shows the signal of the sector mark obtained from the groove. FIG. 7(b) shows the signal obtained from the land. The lengths of the signals of the sector mark shown in FIGS. 7(a) and 7(b) are substantially equal to each other. That is, even when the concavo-convex pits of the sector mark region formed in both tracks are disposed adjacent to each other in the seek direction, the start of the sectors can be correctly detected and the distortion of the TES can be avoided with the aperture width of the concavo-convex pits of the sector marks formed in the land tracks being slightly smaller than the aperture width of the concavo-convex pits formed in the groove tracks and with the lengths of the concavo-convex pits formed in the land tracks and the groove tracks being uniform, whereby errors in counting the number of tracks can be avoided.

Although in the present embodiments, sector mark signals are used as signals common between the land tracks and the groove tracks, other signals may be used for obtaining the same advantages, according to the present invention. For example, since VFO signals are common signals, VFO signals may be disposed adjacent to each other by controlling the shapes in the same manner as in the sector marks, whereby the overall lengths of the headers can be reduced and the data capacity can be increased. However, since the VFO signals are preferably disposed immediately before the signals to be read due to the characteristics thereof, only the sector marks are disposed adjacent to each other, according to the present embodiments. Common signals which have no restriction in the layout can be positioned in both tracks adjacent to each other, as described above.

According to the present invention, grooves are formed in the control data regions provided with the concavo-convex pits, whereby errors in counting the number of tracks are not likely to occur. Therefore, reliable seeking can be performed at a high speed.

Since the grooves are also formed in the header data regions provided with the concavo-convex pits, whereby errors in counting the number of tracks are not likely to occur and header data (particularly, sector marks) can be correctly detected from the land tracks and the groove tracks. Therefore, the disk can be reliably accessed at a high speed.

What is claimed:

1. An optical disk comprising:
   at least a rewritable region and a read-only data region,
   wherein the rewritable region includes a plurality of groove tracks and a plurality of land tracks,
   the read-only data region includes a plurality of groove tracks and a plurality of land tracks,
   read-only data comprising control data are written as concavo-convex pits to the groove tracks and/or the land tracks in the read-only data region, and
   the width of each groove in the read-only data region is smaller than that of each groove in the rewritable region,
   wherein the read-only data written as the concavo-convex pits formed in the groove tracks have contents different from the read-only data written as the concavo-convex pits formed in the land tracks, the read-only data written as the concavo-convex pits formed in the groove tracks are data related to the groove tracks in the rewritable region, and the read-only data written as the concavo-convex pits formed in the land tracks in the read-only data region are data related to the land tracks in the rewritable region.

2. An optical disk as recited in claim 1, wherein the width of the grooves in the read-only data region is smaller than an aperture width of the concavo-convex pits formed in the groove tracks in the read-only data region.

3. An optical disk as recited in claim 1, wherein each track comprises a plurality of sectors and the read-only data comprising the control data are formed in specific sector.

4. An optical disk as recited in claim 1, wherein the control data in the land tracks and the control data in the groove tracks are arranged so as not to be adjacent to each other.

5. An optical disk as recited in claim 3, wherein the read-only data comprising header data are written in each sector in the read-only data region.

6. An optical disk for a land/groove recording method comprising:
   a plurality of groove tracks each including a rewritable region and a plurality of land tracks each including a rewritable region,
   wherein each of the tracks is divided into a plurality of sectors,
   the optical disk is provided with read-only data regions which are individually positioned in the sectors of the groove tracks and the land tracks and which are written with read-only data, which are header data, as concavo-convex pits,
   the read-only data written to the groove tracks include data common to the read-only data written to the land tracks, some or all of concavo-convex pits of the groove tracks representing the common data have a different width and depth from the width and depth of some or all of concavo-convex pits of the land tracks representing the common data, and said some or all of the concavo-convex pits of the groove tracks are adjacent to said some or all of the concavo-convex pits of the land tracks in the radial direction of the optical disk,
   wherein the common data in the read-only data region are sector marks, the concavo-convex pits in the groove tracks in the read-only data regions have an aperture width and/or depth larger than the width and/or depth of the grooves, and the grooves in the read-only data regions have a width and/or depth smaller than the width and/or depth of the grooves in corresponding rewritable regions.

7. An optical disk as recited in claim 6, wherein, in the read-only data region, the concavo-convex pits in the land tracks have an aperture width and/or depth smaller than the aperture width and/or depth of the concavo-convex pits in the groove tracks.

* * * * *